United States Patent [19]
Yeh et al.

[11] Patent Number: 5,155,160

[45] Date of Patent: * Oct. 13, 1992

[54] POLYOLEFIN FILMS HAVING IMPROVED BARRIER PROPERTIES

[75] Inventors: Gene H. Yeh, San Ramon; Attila Matray, Danville; Allyn J. Ziegenhagen, Berkeley, all of Calif.

[73] Assignee: James River II, Inc., Cincinnati, Ohio

[*] Notice: The portion of the term of this patent subsequent to Aug. 25, 2009 has been disclaimed.

[21] Appl. No.: 551,674

[22] Filed: Jul. 10, 1990

Related U.S. Application Data

[63] Continuation of Ser. No. 188,923, May 2, 1988, abandoned.

[51] Int. Cl.⁵ .................. C08K 5/01; C08L 91/06
[52] U.S. Cl. .................. 524/487; 524/489; 428/348; 428/476.1; 428/484; 428/523
[58] Field of Search .......... 524/487, 489; 428/484, 428/348, 476.1, 523

[56] References Cited

U.S. PATENT DOCUMENTS

| | | | |
|---|---|---|---|
| 3,010,860 | 11/1961 | Eberl . | |
| 3,084,128 | 4/1963 | Stillwagon . | |
| 3,182,033 | 5/1965 | Gregorian | 524/487 |
| 3,210,305 | 10/1965 | Coenen et al. . | |
| 3,227,669 | 1/1966 | Sauer . | |
| 3,389,107 | 6/1966 | Hunter et al. . | |
| 3,447,883 | 6/1969 | Boyer et al. . | |
| 3,536,644 | 10/1970 | Frizelle et al. | 524/487 |
| 3,665,068 | 5/1972 | Duling et al. . | |
| 3,751,281 | 8/1973 | Peterson et al. . | |
| 4,032,493 | 6/1977 | Pascual . | |
| 4,442,243 | 4/1984 | Woodhams | 524/487 |

Primary Examiner—George F. Lesmes
Assistant Examiner—Terrel Morris
Attorney, Agent, or Firm—Stanley M. Teigland

[57] ABSTRACT

The barrier properties of crystalline polyolefin film can be improved substantially by incorporating a precise amount of a partially incompatible wax into the polyolefin. When the polyolefin is polypropylene or polybutylene, the wax is preferably a paraffin wax. The precise amount of wax, which produces optimum improvement in barrier properties, lies in the range of about 3 to 10 percent based on the weight of the polyolefin. The range in which excellent results are obtained can be broadened by contacting the film with a cooling medium immediately after it is extruded. The film may be annealed to further improve the barrier properties.

14 Claims, 2 Drawing Sheets

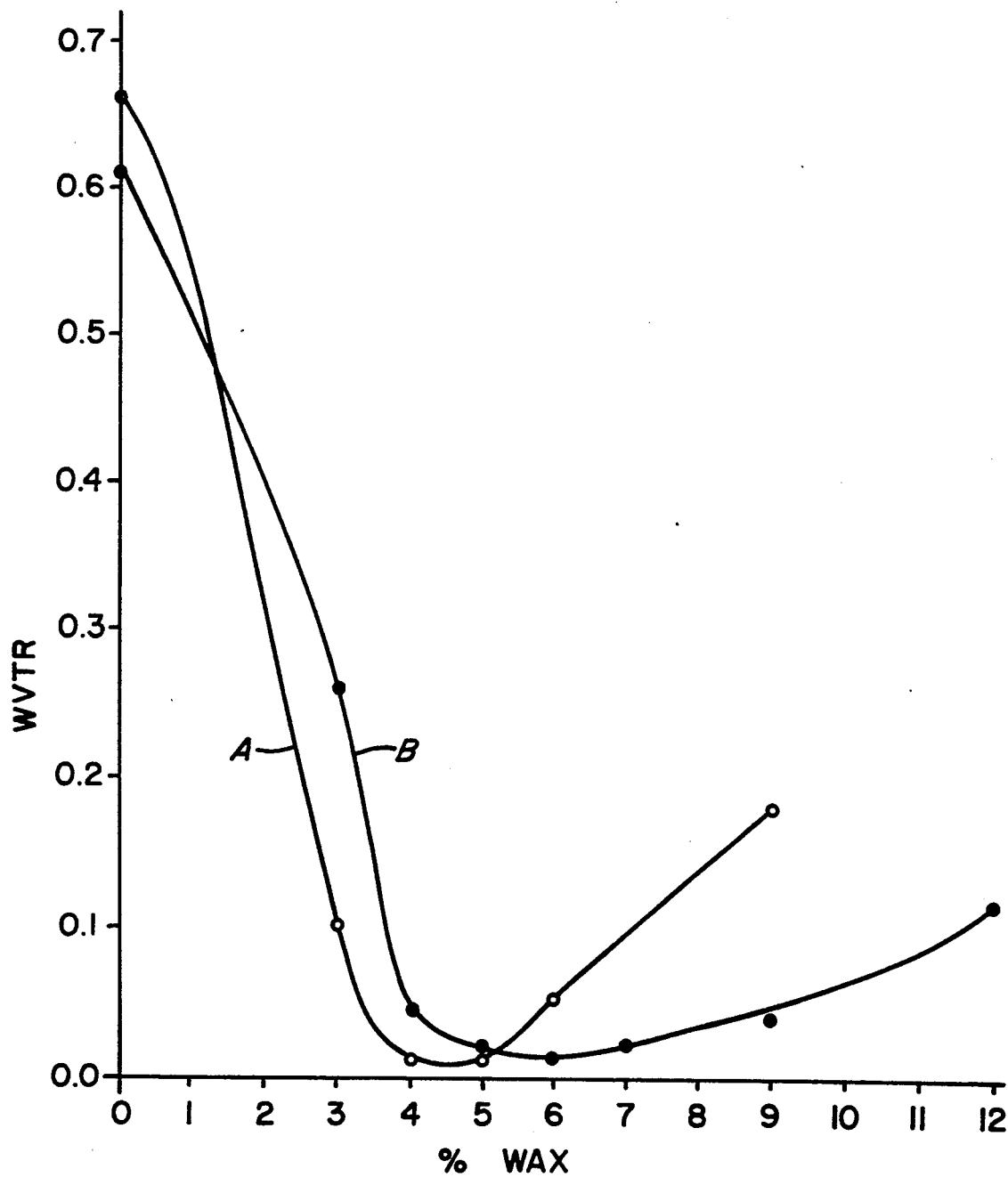
FIG._1.

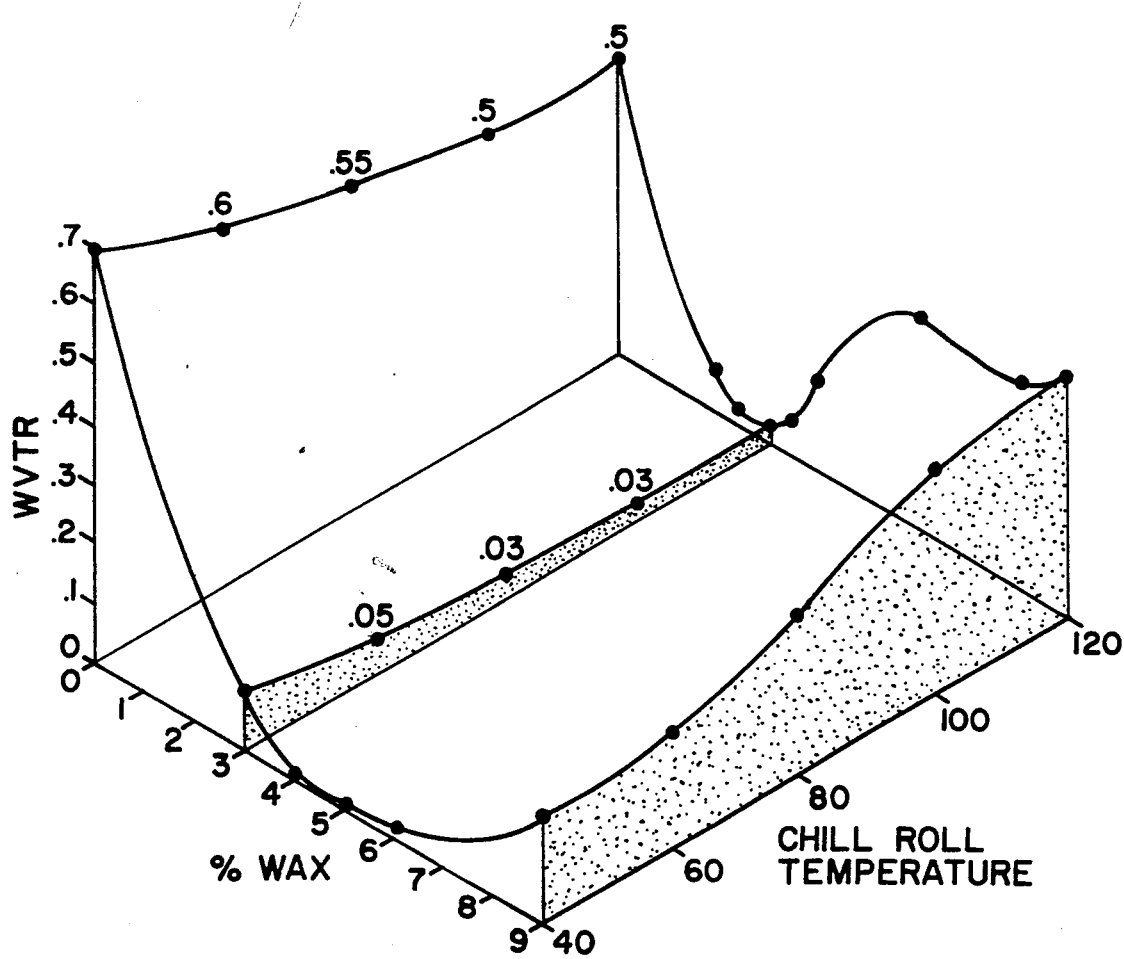
FIG._2.

POLYOLEFIN FILMS HAVING IMPROVED BARRIER PROPERTIES

This is a continuation of copending application Ser. No. 07/188,923 filed on May 2, 1988, now abandoned.

This invention relates to extruded plastic films having a layer comprising a polyolefin. An important property of such films when they are used to package certain articles, especially food, is the ability of the film to act as a barrier to moisture, oxygen and aroma. This invention provides polyolefin films having improved barrier properties.

In accordance with this invention, the barrier properties of an extruded plastic film having a layer comprising a crystalline polyolefin are substantially improved by adding to the polyolefin a certain amount of wax. The amount of wax added depends on the type of polyolefin and the rate at which the film is cooled but generally the amount is between about two and twelve percent, preferably between about three and ten percent by weight based on the weight of the polyolefin. When the water vapor transmission rate (WVTR) of the film is plotted against the concentration of wax in this range, the graph forms a concave curve having a low point or nadir in the range. Within the range the wax reduces the water vapor transmission rate at least four fold, preferably at least ten fold, and at or near the low point, at least twenty fold. Referring to the wax concentration at the low point of WVTR as $C_L$, the wax concentration preferably ranges from $C_L$ minus 3 $C_L$ plus 3, more preferably from $C_L$ minus 2 to $C_L$ plus 2. The WVTR of the films of this invention is preferably less than 0.2, more preferably less than 0.1, and most preferably less than 0.05 grams/100 square inches/24 hours.

BRIEF DESCRIPTION OF THE DRAWINGS

FIG. 1 is a graph showing the relationship between water vapor transmission rate and the concentration of paraffin wax in propylene homopolymer film (curve A) and ethylene-propylene copolymer film (curve B).

FIG. 2 is a graph showing the relationship between water vapor transmission rate, chill roll temperature in degrees fahrenheit, and the concentration of paraffin wax in polypropylene film.

Crystalline polyolefins include polyethylene, isotactic polypropylene, polybutylene, poly-4-methylpentene-1, copolymers of propylene with up to 7 percent ethylene by weight, copolymers of butylene with up to 5 percent ethylene by weight, and copolymers of propylene and butylene. The degree of crystallinity of the polyolefin is preferably greater than about 25 percent, more preferably greater than about 30 percent. Polyolefins that are not crystalline include atactic polypropylene, polyisobutylene, ethylene-propylene copolymer rubbers, and copolymers of an olefin with a polar monomer, such as ethylene-vinyl acetate copolymer.

Even the most crystalline polyolefins have some amorphous regions. In the practice of this invention, it is believed that the wax is incompatible with the crystalline regions of the polyolefin and has limited compatibility with the amorphous regions. It is further believed that the wax crystallizes in the amorphous regions of the polyolefin, and that this phenomenon explains the significant improvement in barrier properties.

The wax is preferably a hydrocarbon wax, which may be either a mineral wax or a synthetic wax. The type of wax depends on the type of polyolefin. When the polyolefin is polyethylene, the preferred wax is synthetic polypropylene wax, with polyethylene type waxes being unsuitable because they are compatible with crystalline polyethylene. When the polyolefin is a poly-alpha-olefin, the preferred wax is a polyethylene type wax, with synthetic polypropylene waxes being unsuitable because they are compatible with poly-alpha-olefins.

The polyethylene type wax preferably has an average chain length between about 22 and 65 carbon atoms, a molecular weight between about 300 and 800, and a melting point between about 125° and 190° F. (52° and 88° C.). These waxes include paraffin waxes, microcrystalline waxes, and intermediate waxes. Most preferred are paraffin waxes, which typically have an average chain length between about 22 and 40 carbon atoms, a molecular weight between about 300 and 450, and a melting point between about 125° and 160° F. (52° and 71° C.). The paraffin wax preferably consists of a mixture of normal and nonnormal paraffins, with the normal paraffin content preferably being from about 35 to 90 percent by weight. The paraffin wax preferably has a broad molecular weight distribution. For example, each fraction of chains containing a certain number of carbon atoms preferably represents less than 25 percent, more preferably less than 20 percent, of the wax. A paraffin wax having a broad molecular weight distribution provides better barrier properties than a paraffin wax having a narrow molecular weight distribution, which is believed to be due to the formation by the wax having the broad molecular weight distribution of crystallites that have a morphology that conforms better with the morphology of the amorphous regions of the polyolefin. Best results have been observed with a paraffin wax available commercially under the designation Chevron 143. It has a melting point of about 143° F. (62° C.), an average chain length of 29 carbon atoms, an average molecular weight of about 417, a normal paraffin content of about 75 percent, and contains about 12 percent $C_{28}$ fraction, 12 percent $C_{29}$ fraction, and 11 percent $C_{30}$ fraction (the three largest fractions in the wax).

The amount of wax depends on the amorphousness of the polyolefin, which in turn depends on the type of polyolefin, the method of cooling the extruded film containing the polyolefin, and the thickness of the film. When the film is a single layer film of propylene homopolymer having a thickness between about one and two mils, and the film is cast extruded onto a chill roll having a temperature of about 4° C. (39° F.), maximum improvement in moisture barrier is obtained when the polypropylene contains between about four and five percent wax, as shown by curve A in FIG. 1. When this amount of wax is exceeded, the excess wax adversely affects the moisture barrier property, which is believed to be due to the wax exceeding its limit of compatibility with the amorphous region of the polypropylene. When the polyolefin is a copolymer of propylene and about five percent ethylene, and the film is extruded under the same conditions, maximum improvement in moisture barrier is obtained when the amount of wax is about six percent, as shown by curve B in FIG. 1. Slightly more wax is required because the copolymer is more amorphous than the homopolymer. However, the copolymer is able to contain excess wax without as much adverse effect on moisture barrier, which is believed to be due to the ability of the amorphous region to absorb more of the excess wax.

The temperature of the chill roll affects the extent of the amorphous region of the polyolefin, especially near the surface of the film contacting the chill roll. Decreasing the temperature of the chill roll has the effect of increasing the extent of the amorphous region, with the result that slightly more wax is required to achieve maximum improvement in moisture barrier, but excess wax has less adverse effect on moisture barrier, as shown in FIG. 2. Hence, in practicing this invention on a large scale, it is desirable to cool the extruded film in order to broaden the tolerance specifications for the concentration of wax in the polyolefin. The film may be cooled by contacting it with a cooling medium. For cast film the cooling medium is normally a chill roll. For blown film, the cooling medium may be a fluid, such as water or forced air. Forced air may also be used on the other surface of cast film. The temperature of the cooling medium is preferably between about 0° and 25° C. (32° and 77° F.).

For conventional crystalline polyolefin films containing no wax, decreasing the temperature of the chill roll has the effect of making the moisture barrier worse, which is the opposite of the effect observed for most of the range of wax concentration within the scope of this invention.

The film of this invention may be annealed to improve the barrier properties of the film. The film may be annealed by heating it to an elevated temperature, preferably ranging from the melting point of the wax to a temperature about twenty degrees Celsius less than the softening point of the polyolefin, and then rapidly cooling the film, such as by quenching the film in water. This aspect of the invention is illustrated in Example 23.

When the proper amount of wax is added to the polyolefin, it has a very slight effect on the clarity of the polyolefin layer. For example, when film of the ethylene-propylene copolymer referred to in FIG. 1 contains six percent paraffin wax, it has a haze value, measured in accordance with ASTM-D1003-82, of 14 compared to a haze value of 8 for the corresponding film containing no wax. However, when the wax concentration is increased to nine percent and twelve percent, the haze value is increased to 55 and 88, respectively, by the excess wax. The effect of the excess wax on the clarity of the film can be mitigated by annealing the film. For example, when the films containing the excess wax are heated to 200° F. (93° C.) and then quenched, the haze values are reduced to 13.5 and 18.5, respectively. The annealing also improves the WVTR of the films.

The adverse effect of excess wax can also be mitigated by adding to the polyolefin a minor amount, preferably less than twenty percent, more preferably less than twelve percent, of an amorphous polymer compatible with the wax. The amorphous polymer preferably has limited compatibility with the polyolefin. This embodiment is illustrated in Example 17.

As the extruded film cools, the interior of the polyolefin layer crystallizes, leaving an amorphous region near each surface of the layer, which is where the wax is believed to migrate. However, the effect of the wax is not a surface effect because no wax is observed on the surface when the proper amunt of wax is employed, and the moisture barrier of the film is not adversely affected by creasing the film. On the other hand, because the wax is concentrated near each surface, with the interior of the polyolefin layer being more crystalline because of its slower rate of cooling, increasing the thickness of the film does not require a corresponding increase in the amount of wax added to the polyolefin.

Although the wax tends to concentrate near the surface of the polyolefin layer, the film is preferably prepared by extruding a blend of the polyolefin and substantially all of the wax as a core layer in a coextruded film, even when only a single layer film is desired. For example, if it is desired to prepare a single layer film of polypropylene containing three percent wax, the film is preferably prepared by coextruding a core layer containing nine percent wax sandwiched between skin layers of polypropylene containing no wax, with the thickness of each layer being the same. This method of preparing the film also avoids the problem of plate-out of the wax on the chill roll. In order to equalize the viscosities of the layers, the polypropylene in the core layer preferably has a lower melt index than the polypropylene in the skin layers. Although the wax is in the core layer initially, it migrates toward each surface as the core layer crystallizes. Hence, as used herein, the term "polyolefin layer" includes adjacent layers of crystalline polyolefins that are coextruded together.

The films of this invention wherein the polyolefin is a poly-alpha-olefin may be monoaxially or biaxially oriented to improve their properties. Biaxial orientation may be accomplished in accordance with conventional methods, such as by blowing tubular film or by stretching cast film using a tenter frame. The oriented films may be used as heat shrinkable films to package various articles, particularly food, to provide excellent barrier to moisture, oxygen, aroma and the like.

This invention has been described with particular reference to moisture barrier, in part because it serves as a basis to determine the optimum amount of wax to add to the polyolefin layer, but addition of the wax also substantially improves other barrier properties, such as by lowering the oxygen transmission rate (OTR), as illustrated in Examples 4, 7 and 8, and by lowering the aroma transmission rate, as illustrated in Example 12. The wax reduces the OTR at least four fold, preferably at least ten fold, and reduces the aroma transmission rate at least two fold, preferably at least four fold.

The film of this invention may be a single layer film or a coextruded film wherein other resins form other layers of the film. However, a polyolefin layer containing the wax (either initially or by migration) preferably forms an outer surface of the coextruded film. The film may also be laminated to a substate, such as oriented polypropylene or paper or paperboard, such as by extrusion coating or by means of an adhesive. However, to prevent migration of the wax to paper, the paper and the wax-containing polyolefin layer are preferably separated by a barrier.

The polyolefin layer may contain minor amounts, preferably less than ten percent, of conventional polymer additives, including colorants, as illustrated in Example 20. However, the polyolefin layer preferably comprises at least eighty percent of crystalline polyolefin. When the polyolefin is polyethylene, the amount of wax is preferably between about 3 and 12 percent. When the polyolefin is propylene homopolymer, the amount of wax is preferably between about 2 and 7 percent. When the polyolefin is a copolymer of propylene and ethylene, the amount of wax is preferably between about 3 and 9 percent. When the polyolefin is polybutylene, the amount of wax is preferably between about 3 and 10 percent. When the polyolefin is a copolymer of butylene and ethylene, the amount of wax is preferably between about 3 and 12 percent. The polyolefin layer may comprise a blend of crystalline poly-alpha-olefins.

In the following examples WVTR was measured at 100° F. (38° C.) and 90 percent relative humidity in accordance with ASTM E96 and TAPPI Standard T464. All percentages are by weight.

Comparative Example A and Examples 1-3

Single layer films were prepared by extruding blends of polybutylene (PB-0110) with various amounts of a paraffin wax available commercially under the designation Chevron 143. The films were cooled immediately after extrusion by contacting them with a chill roll having a temperature of 10° C. (50° F.). The WVTR of each film was measured. The results are shown in the Table.

Comparative Example B and Examples 4-8

Examples A and 1-3 were repeated except polypropylene (Shell 5384) was substituted for the polybutylene and the chill roll temperature was 4° C. (39° F.). The results are shown in the Table and in FIG. 1 (curve A). In addition, the OTR of the films of Examples B, 4, 7 and 8 were measured at 72° F. (22° C.) and 45 percent relative humidity in accordance with ASTM-D3985-81. The respective values per mil of film thickness were 243, 8.2, 11.5, and 85 cc/100 square inches/24 hours. A graph of these values plotted against wax concentration would form a concave curve having a low point at or near the same wax concentration as the low point for WVTR.

Comparative Example C and Examples 9-15

Examples B and 4-8 were repeated except a copolymer of propylene and about five percent ethylene (Himont SD-062) was substituted for the polypropylene. The results are shown in the Table and in FIG. 1 (curve B). FIG. 1 shows that the copolymer requires more wax than the homopolymer to achieve an optimum reduction in WVTR but excellent results are obtained over a broader range of wax concentration. In other words, the meniscus of the curve is shifted to the right and is broader. This is believed to be due to the fact that the copolymer has a higher proportion of amorphous phase. In addition, the aroma transmission rate of the films of Examples C and 12 were measured using a solution of one percent amyl acetate in propylene glycol as the aromatic substance. The aroma transmission rate of the film of Example 12 was 0.34 mg/100 square inches/24 hours compared to a rate of 1.70 for the film of Example C, a five fold reduction.

Example 16

Example 15 was repeated except the temperature of the chill roll was increased to 10° C. As shown in the Table, this increase in temperature resulted in a substantial increase in the WVTR.

Example 17

Example 16 was repeated except the blend contained ten percent by weight of a copolymer of ethylene and 18 percent vinyl acetate. As shown in the Table, the WVTR was substantially reduced compared to the film of Example 16. The film was also much clearer. These results are believed to be due to absorption of excess wax by the ethylene-vinyl acetate copolymer. This example illustrates the use of an amorphous polymer to mitigate the adverse effect of excess wax on WVTR and clarity.

Example 18

Example 12 was repeated except the temperature of the chill roll was 10° C. and n-octacosane was employed as the wax. As shown in the Table, the WVTR was substantially increased compared to the film of Example 12. While some of the increase is attributable to the higher temperature of the chill roll, more of the increase is believed to be attributable to the narrow molecular weight distribution of the wax. Although the wax employed in the previous examples has about the same average chain length as octacosane, it has a broader molecular weight distribution, which is believed to provide better moisture barrier by producing crystallites or platelets that form a better boundary layer in the amorphous regions of the polyolefin.

Comparative Example D and Example 19

Machine glazed paper having a basis weight of 25 pounds was extrusion coated with high density polyethylene alone and with 6 percent by weight of a polypropylene wax having a molecular weight of about 3000 (Hoechst-Celanese PP-230). The extrusion coatings were cooled immediately after extrusion by contacting them with a chill roll having a temperature of 25° C. As shown in the Table, the wax reduced the WVTR of the coated paper about 33 percent. It is believed that better results would be obtained using a polypropylene wax having a molecular weight less than 3000 and a higher isotactic content, but such waxes are not presently available commercially. Nevertheless, this example illustrates that the principle of this invention is applicable to polyethylene as well as poly-alpha-olefins, although better results have been obtained with poly-alpha-olefins.

Example 20

Example 11 was repeated except the blend contained ten percent titanium dioxide pigment. As shown in the Table, the inorganic pigment did not have a substantial adverse effect on the WVTR of the film.

Example 21

Example 7 was repeated except a microcrystalline wax having a melting point between 170° and 180° F. (Witco W-445) was substituted for the paraffin wax and the chill roll temperature was 10° C. The results are shown in the Table.

Example 22

Example 21 was repeated except an intermediate was (Chevron 159) was substituted for the microcrystalline wax. The wax has a melting point of 159° F. (71° C.), an average chain length of 37 carbon atoms, an average molecular weight of 520, and a normal paraffin content of 45 percent. As shown in the Table, the intermediate wax reduced the WVTR more than the microcrystalline wax but not as much as the paraffin wax.

In the following table, the unit for gauge (thickness) is mil and the units for WVTR are grams/100 square inches/24 hours.

TABLE

| Example | Polyolefin | Wax | Temp. | Gauge | WVTR | WVTR/mil |
|---------|------------|------|--------|-------|------|----------|
| A | PB | None | 10° C. | 1.5 | 0.62 | 0.93 |
| 1 | " | 3% | " | 1.2 | 0.06 | 0.07 |
| 2 | " | 4.5% | " | 1.5 | 0.03 | 0.05 |
| 3 | " | 6% | " | 1.3 | 0.03 | 0.04 |
| B | PP | None | 4° C. | 1.0 | 0.66 | 0.66 |
| 4 | " | 3% | " | 1.0 | 0.10 | 0.10 |
| 5 | " | 4% | " | 1.1 | 0.02 | 0.02 |
| 6 | " | 5% | " | 1.2 | 0.01 | 0.01 |
| 7 | " | 6% | " | 1.1 | 0.03 | 0.03 |
| 8 | " | 9% | " | 1.0 | 0.18 | 0.18 |
| C | coPP | None | " | 1.2 | 0.51 | 0.61 |
| 9 | " | 3% | " | 1.2 | 0.22 | 0.26 |
| 10 | " | 4% | " | 1.3 | 0.03 | 0.04 |
| 11 | " | 5% | " | 1.3 | 0.02 | 0.03 |
| 12 | " | 6% | " | 1.2 | 0.01 | 0.01 |
| 13 | " | 7% | " | 1.2 | 0.02 | 0.02 |
| 14 | " | 9% | " | 1.2 | 0.05 | 0.06 |
| 15 | " | 12% | " | 1.2 | 0.10 | 0.12 |
| 16 | " | " | 10° C. | 1.2 | 0.34 | 0.40 |
| 17 | coPP + EVA | " | " | 1.6 | 0.08 | 0.13 |
| 18 | coPP | 6% | " | 1.5 | 0.16 | 0.24 |
| D | PE | None | 25° C. | 1.7 | 0.27 | 0.46 |
| 19 | " | 6% | " | 1.4 | 0.21 | 0.29 |
| 20 | coPP + TiO$_2$ | 5% | 4° C. | 1.4 | 0.03 | 0.04 |
| 21 | PP | 6% | 10° C. | 1.4 | 0.11 | 0.15 |
| 22 | " | " | " | 1.3 | 0.06 | 0.09 |

Example 23

Example 14 was repeated except the chill roll was at ambient termperature. After being allowed to cool, the film was annealed by being heated from ambient temperature to 200° F. (93° C.), and then quenched in ice water. The film had a WVTR of 0.14 before being annealed and a WVTR of 0.06 after being annealed. The haze of the film was reduced from 55 to 13.5. This example illustrates the beneficial effect of annealing on the films of this invention.

Example 24

A three-layer film was coextruded onto an oriented polypropylene film. The coextruded film consisted of skin layers of ethylene-methylacrylate copolymer and a core layer consisting of blend of polypropylene and 9 percent by weight of a paraffin wax. The laminate had a WVTR of about 0.15. Without the wax, the laminate would have a WVTR of about 0.35. This example illustrates the preparation of a laminate from a coextruded film prepared in accordance with this invention.

We claim:

1. In an extruded film having a layer comprising a crystalline polyolefin selected from the group consisting of isotactic polypropylene, polybutylene, poly-4-methylpentene-1, copolymers of propylene with up to 7 percent ethylene by weight, copolymers of butylene with up to 5 percent ethylene by weight, and copolymers of propylene and butylene, the improvement wherein the layer contains an amount of wax which substantially reduces the water vapor transmission rate of the layer, the layer having a water vapor transmission rate of less than about 0.2 gram/100 square inches/24 hours, the amount of wax being between about two and about twelve percent based on the weight of the polyolefin, the wax being a polyethylene type wax having a molecular weight between about 300 and 800.

2. The improvement of claim 1 wherein the wax is a paraffin wax.

3. The improvement of claim 2 wherein the wax reduces the water vapor transmission rate of the layer at least four fold.

4. The improvement of claim 2 wherein the wax reduces the oxygen transmission rate at least four fold.

5. The improvement of claim 2 wherein the wax reduces the aroma transmission rate at least two fold.

6. The improvement of claim 3 wherein the polyolefin is propylene homopolymer and the amount of wax is between about 2 and 7 percent by weight.

7. The improvement of claim 3 wherein the polyolefin is a copolymer of propylene and up to 7 percent ethylene, and the amount of wax is between about 3 and 9 percent by weight.

8. The improvement of claim 3 wherein the polyolefin is butylene homopolymer and the amount of wax is between about 3 and 10 percent by weight.

9. The improvement of claim 3 wherein the film has been contacted with a cooling medium immediately after being extruded.

10. The improvement of claim 9 wherein the temperature of the cooling medium is between about 0° and 25° C.

11. The improvement of claim 3 wherein the layer contains up to about 20 percent by weight of an amorphous polymer compatible with the wax.

12. The improvement of claim 11 wherein the film is oriented.

13. The improvement of claim 12 wherein the film is heat shrinkable.

14. The improvement of claim 3 wherein the film has been annealed.

* * * * *